United States Patent
Okumura et al.

(10) Patent No.: US 11,700,340 B2
(45) Date of Patent: Jul. 11, 2023

(54) METHOD FOR REGISTERING A TERMINAL IN AN IMAGE FORMING APPARATUS

(71) Applicant: SHARP KABUSHIKI KAISHA, Sakai (JP)

(72) Inventors: Makoto Okumura, Sakai (JP); Hiroki Munetomo, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/544,769

(22) Filed: Dec. 7, 2021

(65) Prior Publication Data

US 2022/0182507 A1 Jun. 9, 2022

(30) Foreign Application Priority Data

Dec. 9, 2020 (JP) .................. 2020-204362

(51) Int. Cl.
*H04N 1/00* (2006.01)
*H04N 1/44* (2006.01)

(52) U.S. Cl.
CPC ..... *H04N 1/00973* (2013.01); *H04N 1/00061* (2013.01); *H04N 1/00427* (2013.01); *H04N 1/00546* (2013.01); *H04N 1/4413* (2013.01)

(58) Field of Classification Search
CPC ... H04N 1/4413; H04N 1/4406; H04N 1/4426
See application file for complete search history.

(56) References Cited

U.S. PATENT DOCUMENTS

| 2013/0250324 A1* | 9/2013 | Tse | H04W 12/06 |
|---|---|---|---|
| | | | 358/1.13 |
| 2020/0128141 A1* | 4/2020 | Sugawara | H04N 1/4433 |
| 2021/0042072 A1* | 2/2021 | Nagano | G06F 3/129 |
| 2021/0044721 A1* | 2/2021 | Trinh | H04N 1/4413 |
| 2022/0029848 A1* | 1/2022 | Ju | H04L 41/0806 |
| 2022/0277084 A1* | 9/2022 | Yang | G06F 21/608 |

FOREIGN PATENT DOCUMENTS

JP 2005-011090 A 1/2005

* cited by examiner

*Primary Examiner* — Benjamin O Dulaney
(74) *Attorney, Agent, or Firm* — ScienBiziP, P.C.

(57) ABSTRACT

An image forming apparatus operable by an operation device includes a storage that stores a plurality of operations, a detector that detects an operation, and a controller. The controller registers a terminal as the operation device if an operation detected by the detector conforms with an operation stored in the storage.

13 Claims, 20 Drawing Sheets

METHOD FOR REGISTERING A TERMINAL IN AN IMAGE FORMING APPARATUS

CROSS-REFERENCE TO RELATED APPLICATIONS

This application claims the benefit of Japanese Patent Application No. 2020-204362 filed on Dec. 9, 2020, which is incorporated herein by reference in its entirety.

BACKGROUND OF THE INVENTION

Field of the Invention

The present invention relates to a method for registration, a system, and an image forming apparatus.

Description of the Background Art

An invention is disclosed, for instance, that allows an image forming apparatus communicatively connected to a remote operation device to include an authentication unit for authenticating a user performing a remote operation and is capable of managing an image forming action effected by the remote operation by the user and causing the remote operation device to display an operation screen corresponding to the user if the user is authenticated by the authentication unit (see JP 2005-11090 A, for instance).

Such conventional technology, however, involves a risk of registering an unintended terminal as an operation device for the image forming apparatus.

An object of the present disclosure is to achieve the registration of an appropriate terminal when a terminal is to be registered as an operation device for an image forming apparatus.

SUMMARY OF THE INVENTION

A method for registration of the present disclosure is a method for registration in an image forming apparatus operable by an operation device. Such method for registration includes detecting an operation of the image forming apparatus, displaying items of a plurality of operations on a display of a terminal connectable to the image forming apparatus, and registering the terminal as the operation device if an item of an operation detected by the detecting conforms with an item of an operation displayed on the display of the terminal.

A system of the present disclosure is a system including an image forming apparatus operable by an operation device, a terminal, and a server. The server transmits items of a plurality of operations to the terminal if receiving a request from the terminal. The terminal displays the items of the plurality of operations received on a display. The image forming apparatus transmits items of a plurality of operations detected by a detector to the server. If the items of the plurality of operations transmitted to the terminal conform with items of a plurality of operations received from the image forming apparatus, the server registers the terminal with the image forming apparatus as the operation device.

An image forming apparatus of the present disclosure is an image forming apparatus operable by an operation device, which apparatus includes a storage that stores items of a plurality of operations, a detector that detects an operation, and a controller. The controller registers a terminal associated with the image forming apparatus as the operation device if an item of an operation detected by the detector conforms with an item of an operation stored in the storage.

According to the above aspects of the present invention, it is possible to register an appropriate device when a second device (terminal, for instance) is to be registered as an operation device for a first device (image forming apparatus, for instance).

DESCRIPTION OF THE PREFERRED EMBODIMENTS

In the following, embodiments for carrying out the present disclosure are described with reference to the accompanying drawings. The embodiments are each an example for explaining the present disclosure, and the technical scope of the invention as recited in the claims is in no way limited to the following description.

In a known technology, a device for performing a remote operation (a second device) is registered with a device to be operated (a first device). For instance, an image forming apparatus is used as the first device and a terminal such as a smartphone is used as the second device so as to operate the image forming apparatus with the terminal.

Various methods are known as a method for registering a terminal with an image forming apparatus in order to remotely operate the image forming apparatus. If a terminal allowing a remote operation is able to be registered with an image forming apparatus simply through the Internet or the like, for instance, a disguise of a third party cannot be prevented. Consequently, a risk of an unwarranted insertion of a charging job such as copying or a failure or malfunction due to the rewriting of settings of the image forming apparatus, and a risk of information leakage, such as wiretapping of an address book, printing information or scanning information are conceivable.

While the conventional method, in which a one-time password is used to issue a personal identification number (PIN) code, is also known, an unintended terminal may be registered by taking over a user interface (UI) screen for issuing a PIN code, for instance.

In particular, malicious attacks are developed day by day, so that there is a high danger of application of a method cracked on another device if a remote operation by a common method is permitted. Thus, a unique method is effective from the viewpoint of security.

In view of such problems, devices described in the following embodiments make it possible to register a device allowing a remote operation under a surer security when the device is to be registered.

1. First Embodiment 1.1 General Configuration

Figure 1:
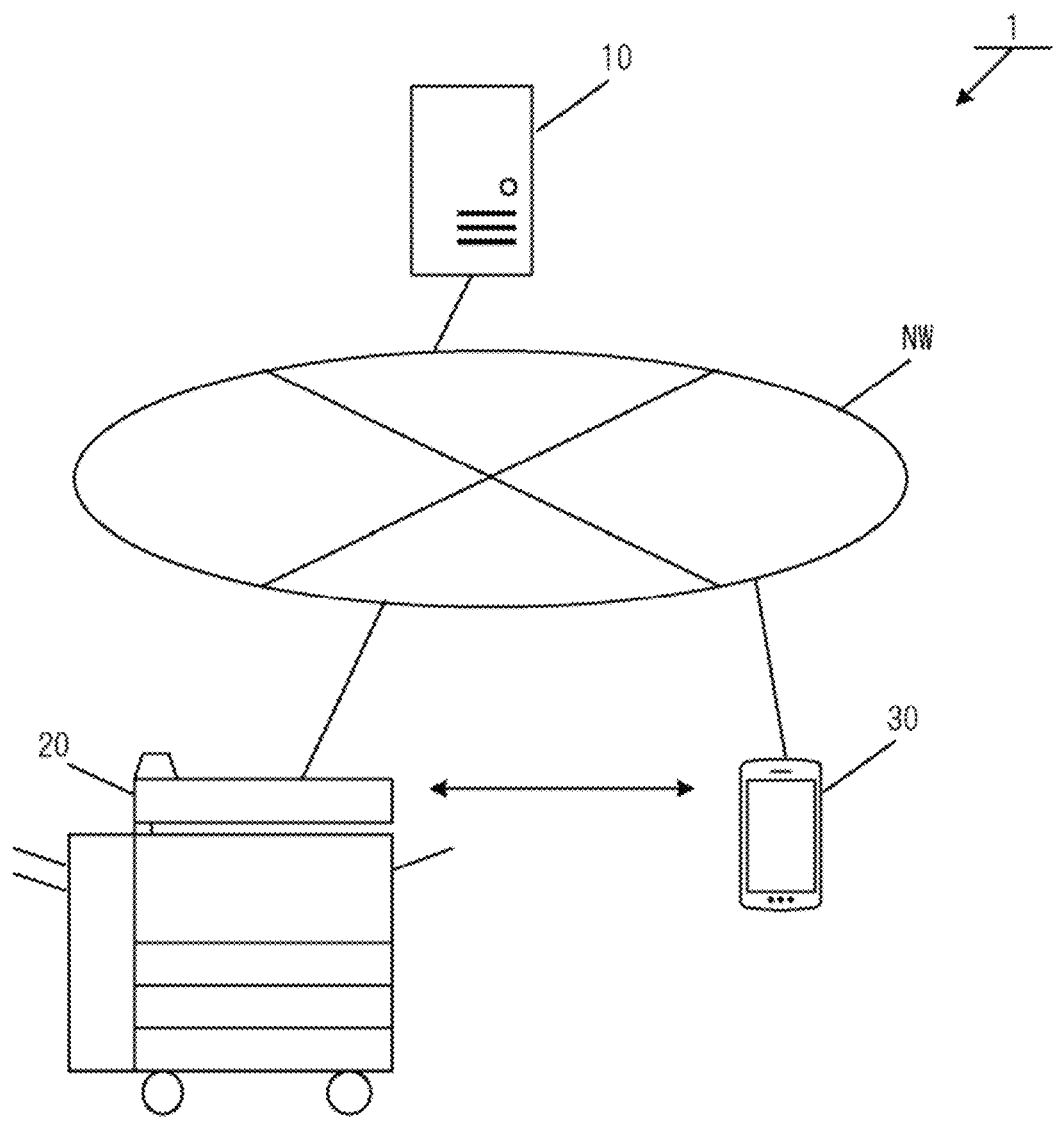
FIG. 1 is a diagram for explaining a total system in a first embodiment.

FIG. 1 is a diagram for schematically explaining a total system in the present embodiment. A system 1 includes a server 10, an image forming apparatus 20, and a terminal 30, for instance. The image forming apparatus 20 and the terminal 30 connected in the system 1 can each be one or more in number. The server 10 may be formed integrally to the image forming apparatus 20.

The server 10, the image forming apparatus 20, and the terminal 30 are connectable to one another on a network NW. The network NW can be constructed by combining a local area network (LAN) and the Internet. The network NW may be the Internet and a LAN may be constructed through a firewall. In that case, the server 10, the image forming apparatus 20, and the terminal 30 are connected to the LAN and are thereby able to communicate with one another.

The image forming apparatus 20 and the terminal 30 may directly be connected to each other. For instance, the image forming apparatus 20 and the terminal 30 may communicate with each other through a communications means (direct Wireless Fidelity (Wi-Fi) or Bluetooth (registered trademark), for instance) other than the network NW.

1.2 Functional Configuration

Next, functional configurations of the server 10, the image forming apparatus 20, and the terminal 30 are described.

1.2.1 Server

Figure 2:
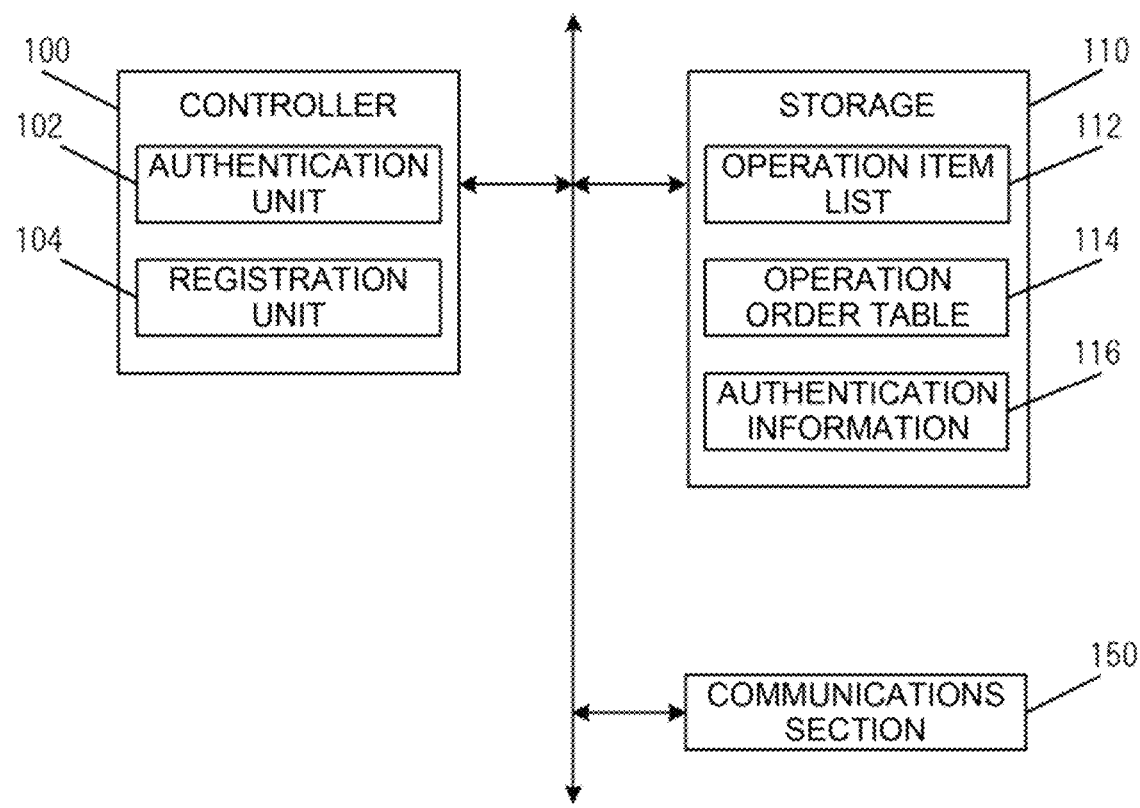
FIG. 2 is a diagram for explaining a functional configuration of a server in the first embodiment.

FIG. 2 is a diagram for explaining a functional configuration of the server 10.

A controller 100 is a functioning part for controlling the server 10 as a whole. The controller 100 reads and executes various programs stored in a storage 110 so as to realize various functions and is constituted of one or more arithmetic units (such as central processing units (CPUs)), for instance.

In addition, the controller 100 executes a program stored in the storage 110 so as to serve as an authentication unit 102 or a registration unit 104.

The authentication unit 102 provides an authentication process used when the image forming apparatus 20 and the terminal 30 are to be connected to each other. The authentication unit 102 can fulfill a common authentication process. The authentication process in the present embodiment is described as a process using a PIN code obtained by using a one-time password. The authentication process may be a process using any of such methods as a method using a stored password, a method using an identification (ID) card, and a method using biometric authentication based on bio-information such as a fingerprint, a palm print, and the iris.

The authentication unit 102 performs the same authentication process as those performed by an authentication unit 204 of the image forming apparatus 20 and an authentication unit 302 of the terminal 30. The authentication units 102, 204, and 302, which perform the authentication process in different devices, fulfill the authentication process appropriately to the devices, respectively.

Figure 6:
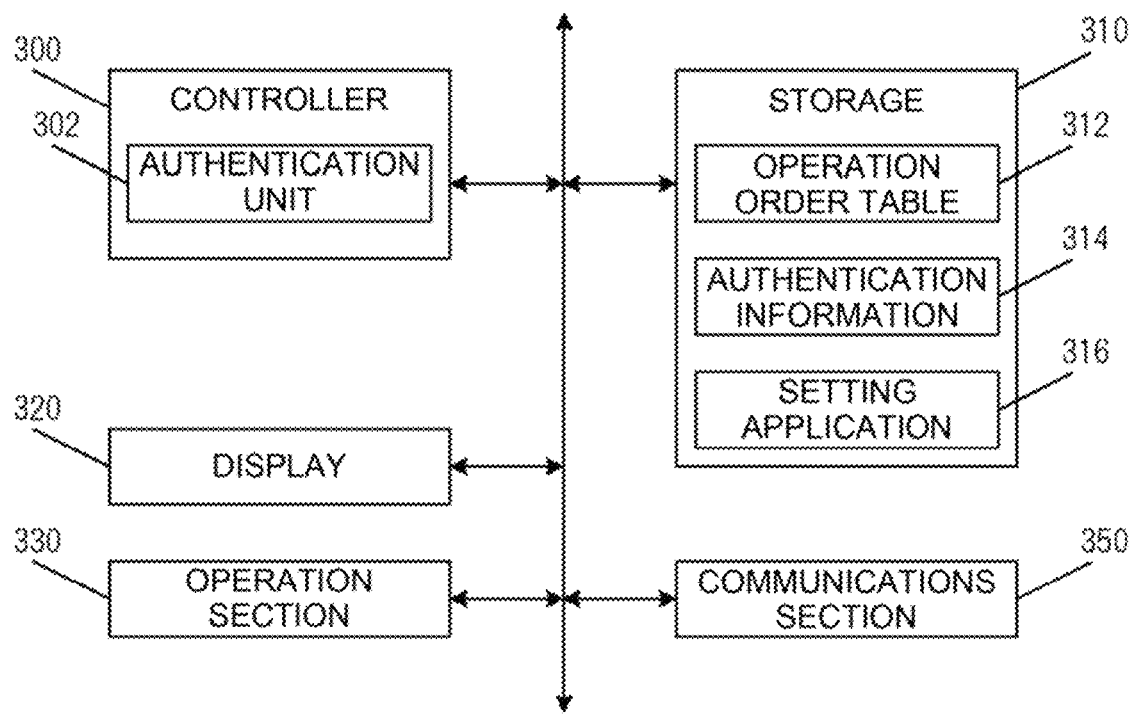
FIG. 6 is a diagram for explaining a functional configuration of a terminal in the first embodiment.

The registration unit 104 performs a process for registering the terminal 30 as an operation device for the image forming apparatus 20. For instance, if the terminal 30 has been registered by the registration unit 104 as an operation device for the image forming apparatus 20, an operation signal input from an operation section 330 of the terminal 30 illustrated in FIG. 6 is transmitted to the image forming apparatus 20. The registration unit 104 registers, as an operation device, the terminal 30, which is one of terminals 30 associated with the image forming apparatus 20 and meets a specified requirement.

The terminal 30, which is registered as an operation device for the image forming apparatus 20, may have a function of a display device. For instance, the contents displayed by the image forming apparatus 20 as a screen may be displayed on a display 320 of the terminal 30 illustrated in FIG. 6.

The storage 110 is the functioning part, in which various programs required for actions of the server 10 and various kinds of data are stored. The storage 110 includes a recording device capable of temporary storage such as a dynamic random access memory (DRAM), and a non-transitory recording device such as a solid state drive (SSD) constituted of a semiconductor memory and a hard disk drive (HDD) constituted of a magnetic disk.

The storage 110 stores an operation item list 112, an operation order table 114, and authentication information 116.

In the operation item list 112, items of operations detectable to the image forming apparatus 20 are stored. For instance, the operation item list 112 stores items of such operations as "opening the front cover", "opening the tray 1", "opening the bypass tray", "opening the document placing stand", and "selecting the energy-saving button".

In the present embodiment, an item of an operation preferably indicates a physical operation. The physical operation refers to an operation that is actually and physically detectable. A physical operation characteristic of the image forming apparatus 20 is especially preferable. Such an action as opening and closing of a tray for paper feed (paper feed cassette) is, as a physical operation, a plain action for a user of the image forming apparatus 20. A physical operation is plain and easy to perform for the user as compared with an input operation through a software key displayed on a touch panel (software operation), for instance.

Examples of a specific physical operation include an action of opening and closing a tray (tray for paper feed, bypass tray, large capacity tray or the like), an action of opening and closing a front cover, a side cover, a scanner cover or a paper feed cassette, and an action of opening and closing a document placing stand, with each of the actions being involved with the detection of opening and closing of the mechanical part in question. In this regard, any of "an action of opening", "an action of closing", and "an action of opening and closing" is detected as a physical operation.

Further thinkable physical operations include an operation to attach and detach a toner cartridge as an action involved with the attachment and detachment of a device, an operation to cause a document sheet to be present on and absent from a document placing stand, an operation to cause a sheet of paper to be present on and absent from a bypass tray, and an operation to attach and detach spare staples. In this regard also, an operation to remove a device or a sheet of paper and an operation to provide a device or a sheet of paper may both be detected as a physical operation.

Manipulation of a physical key may be detected as a physical operation. Manipulation of such physical keys (operation switches) as a power button, an energy-saving button, and a mode changing button is detectable. In that case, pushing down and up as well as selection of a switch may be detected as a physical operation. A long press (pushing in for three or more seconds, for instance) of a switch may also be detected as a physical operation.

While an item of an operation in the present embodiment represents a physical operation, it is also possible to combine a physical operation with a software operation. The user may combine a physical operation with operation of a software key displayed on a touch panel or the like.

In the operation order table 114, the order of items of the operations as above is stored. For instance, the operation order table 114 stores physical operations "opening the front cover", "opening the tray 1", and "selecting the energy-saving button" in this order.

Storage of the order of operations is carried out in any form as long as the order of operations is eventually understood. If the physical operations are stored in the operation order table 114 in the form of "opening the front cover, opening the tray 1, and selecting the energy-saving button", for instance, such storage form can be considered to represent the order of the three operations. It is also possible to store the order of operations in the form of "opening the front cover as a first operation, opening the tray 1 as a second operation, and so forth".

The operation order table 114 may store the order of operations for setting generated by the controller 100. In addition, the operation order table 114 may receive the order of physical operations performed on the image forming apparatus 20 and store the received order as the order of operations. The operation order table 114 may also store the order of physical operations input on the terminal 30.

The authentication information 116 contains information used by the authentication unit 102 during the authentication. If the authentication unit 102 performs authentication using a PIN code, the authentication information 116 contains the PIN code.

A communications section 150 is a functioning part for the connection with a network. The communications section 150 is constituted of an interface connectable to a wired LAN, a wireless LAN or a long term evolution (LTE) network, for instance. Connection of the communications section 150 to such a network allows connection to another device or an external network.

The server 10 may include such components as an operation section and a display apart from the components illustrated in FIG. 2.

1.2.2 Image Forming Apparatus

Figure 3:
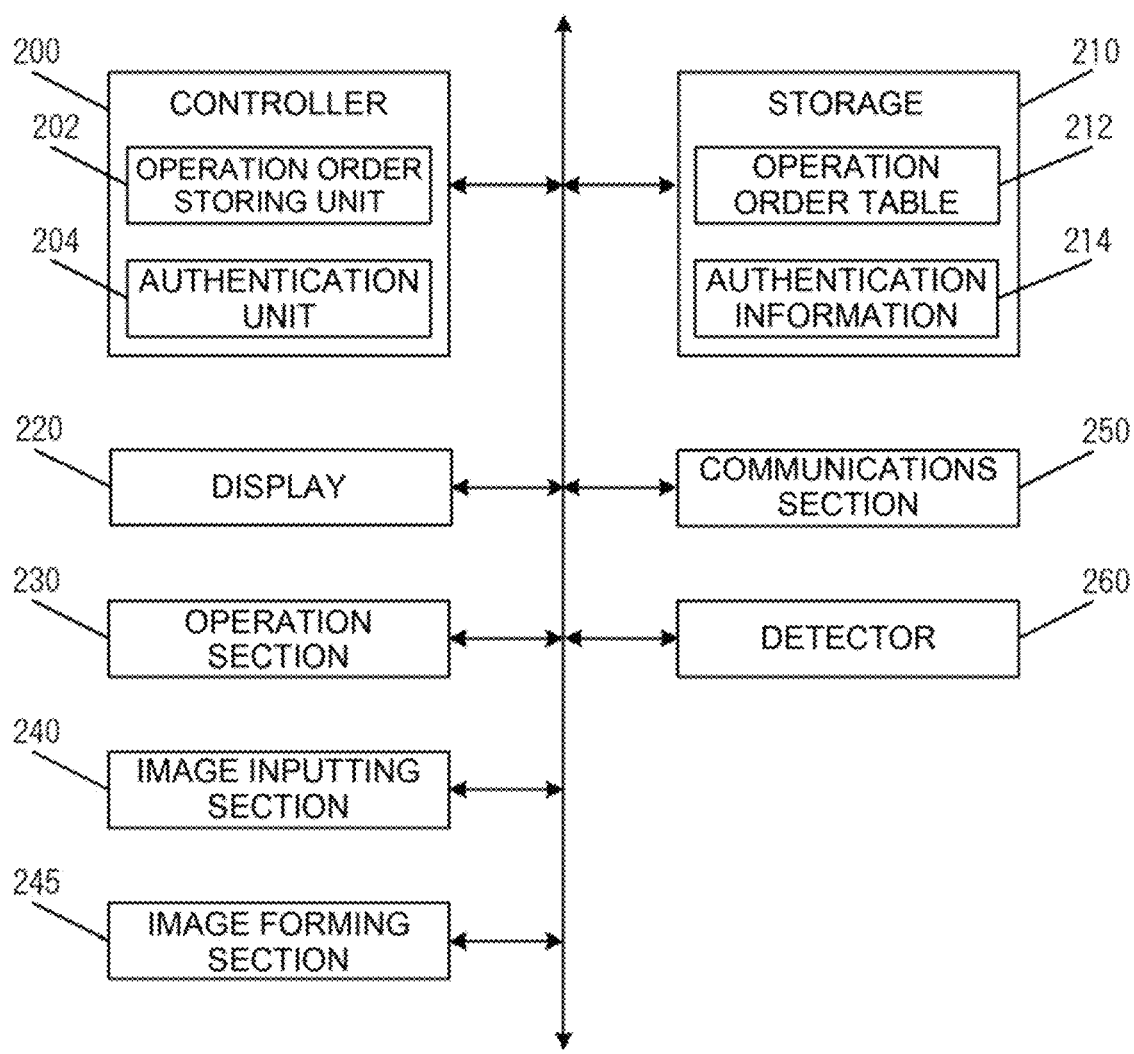
FIG. 3 is a diagram for explaining a functional configuration of an image forming apparatus in the first embodiment.

FIG. 3 is a diagram illustrating an example of a functional configuration of the image forming apparatus 20.

A controller 200 is a functioning part for controlling the image forming apparatus 20 as a whole. The controller 200 reads and executes various programs stored in a storage 210 so as to realize various functions and is constituted of a CPU and the like, for instance.

The controller 200 reads the programs stored in the storage 210 and performs processes so as to realize the respective functions. For instance, the controller 200 serves as an operation order storing unit 202 and the authentication unit 204.

The operation order storing unit 202 chiefly stores an operation order of physical operations as operations detected by a detector 260. In other words, in an operation order storing state (mode), the operation order storing unit 202 sequentially stores physical operations detected by the detector 260 in an operation order table 212.

During the storage of the operation order, items of physical operations performed may simply be stored or the items may be stored in the order of performance of the physical operations along with orders (numbers of order) of the physical operations. The items may also be stored as a list structure in the order of performance of the physical operations.

The storage 210 is the functioning part, in which various programs required for actions of the image forming apparatus 20 and various kinds of data are stored. The storage 210 includes a recording device capable of temporary storage such as a DRAM, and a non-transitory recording device such as a SSD constituted of a semiconductor memory and a HDD constituted of a magnetic disk.

The storage 210 stores the operation order table 212 for storing the operation order and authentication information 214.

In the operation order table 212, the operation order storing unit 202 stores the order of operations detected by the detector 260. It is desirable that the operations detected by the detector 260 are physical operations.

Preferably, the operation order storing unit 202 stores the order of physical operations as a chronological order. In this regard, the operation order storing unit 202 may additionally store the time when an operation was detected. The operation order storing unit 202 stores the order of one or more operations as the operation order. Data may simply be stored in the order of performance of physical operations or may be stored as a list structure.

The authentication information 214 contains information used by the authentication unit 204 during the authentication. If the authentication unit 204 performs authentication using a PIN code, the authentication information 214 contains the PIN code. The authentication information 214 is capable of containing information received from the server 10 and information input by the user.

A display 220 is a functioning part for displaying images and characters. The display 220 is constituted of a liquid crystal display (LCD), an organic electroluminescence (EL)

panel or the like. The display 220 may be a single display device or include an additional display device externally connected.

An operation section 230 accepts the input of an operation from the user. The operation section 230 is constituted of hardware keys or software keys, for instance. The operation section 230 includes a task key for performing a task, such as facsimile (FAX) transmission and image reading, and a stop key for stopping an operation. The operation section 230 may include such physical operation keys 235 as a task key, a stop key, a power key, and a power-saving key.

If the terminal 30 is registered as an operation device for operation, as described later, the operation section 230 is actualized by the terminal 30. The terminal 30 may serve as a display device substituted for the display 220.

An image inputting section 240 reads an image (document) and outputs the read image as image data. The image inputting section 240 is constituted of a common scanner (image inputting device). The image inputting section 240 may input image data from an external storage medium such as a universal serial bus (USB) memory or receive an image over a network.

An image forming section 245 forms an image. For instance, the image forming section 245 uses image data output from the image inputting section 240 to form an image on a recording medium.

A communications section 250 is a functioning part for the connection with a network. The communications section 250 is constituted of an interface connectable to a wired LAN, a wireless LAN or a LTE network, for instance. Connection of the communications section 250 to such a network allows connection to another device or an external network.

The communications section 250 may have a plurality of functions. For instance, the communications section 250 may include a communications section for the connection to a network such as a LAN and a communications section for communicating with a terminal. In addition, the communications section 250 may include a communications section employing short-range radio communication such as near field communication (NFC) and Bluetooth (registered trademark).

The detector 260 detects a physical action on the image forming apparatus 20. The detector 260 chiefly detects a physical action on the image forming apparatus 20 and outputs, to the controller 200, that a physical operation has been detected.

Figure 5A:
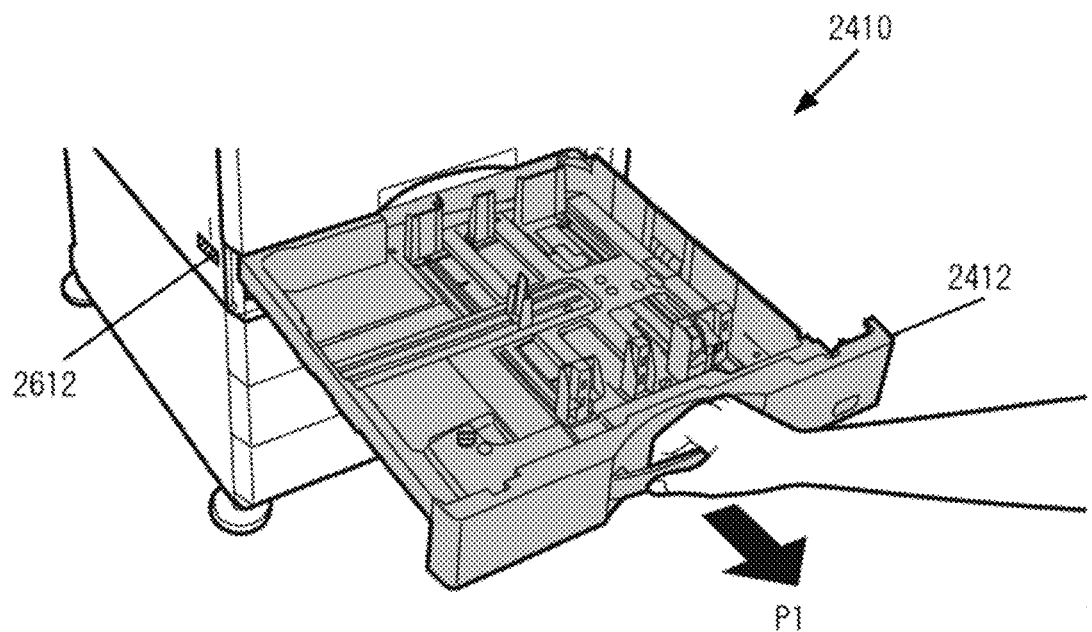
FIGS. 5A and 5B are diagrams for explaining physical operations of the image forming apparatus in the first embodiment.

FIG. 5A is a diagram illustrating, as an example, an action (operation) performed when a tray 2412 is pulled out in a paper feed section 2410. If the tray 2412 is pulled out by the user in a direction P1, for instance, it is detected by a sensor 2612 that the tray 2412 has been pulled out.

Figure 5B:
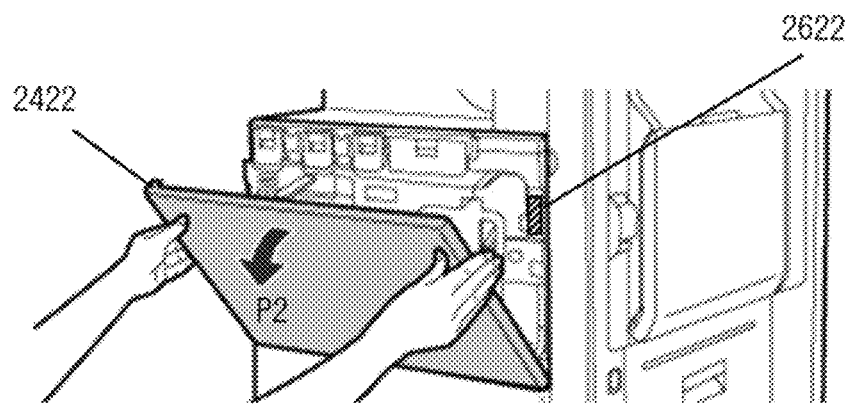

FIG. 5B is a diagram illustrating an action (operation) performed when a front cover 2422 is opened. If the front cover 2422 is opened in a direction P2, it is detected by a sensor 2622 that the front cover 2422 has been opened.

The sensors 2612 and 2622 as an example of the detector 260 may each be a sensor for detecting opening and closing by a physical switch or a sensor using a photosensor or a magnetic sensor.

The detector 260 is capable of detecting any physical action on the image forming apparatus 20. Apart from the actions (operations) as above, such actions as opening of another cover, opening and closing of the bypass tray, opening and closing of an automatic document feeder (ADF), and manipulation of a hardware key may be detected.

The detector 260 may detect that another device has been detected. Detection of a USB device mounted or dismounted, detection of a device capable of NFC communication or detection by a motion sensor may be detected.

Pushing down of an operation button as a hardware key may also be detected. The detector 260 may detect pushing down of such operation buttons as a home button, a power-saving button, and numeric keys.

The detector 260 may detect that the user does not perform a specified operation. If the time to detect an action of opening and closing the tray 2412 is set to be five seconds, for instance, and the action of opening and closing the tray 2412 is not performed for five seconds, it may be detected that "the action of opening and closing the tray 2412 has not been performed".

Figure 4:
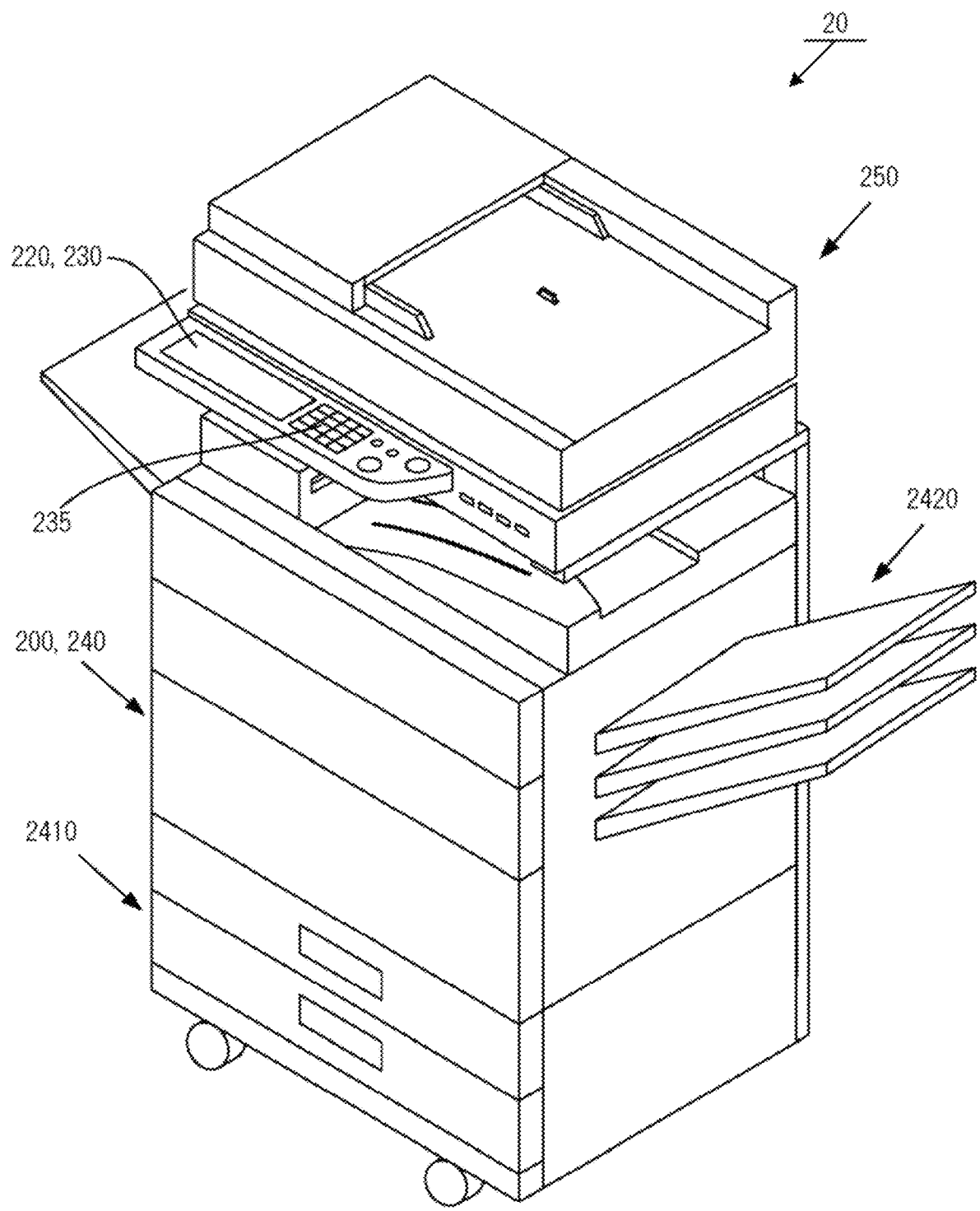
FIG. 4 is a diagram for explaining an appearance of the image forming apparatus in the first embodiment.

As illustrated in FIG. 4, the image forming apparatus 20 may include another required component. For instance, the image forming apparatus 20 includes the paper feed section 2410, a paper discharge section 2420, and the like. In FIGS. 3 and 4, the configuration of the image forming apparatus 20 is illustrated centering at components necessary for the explanation of the present embodiment. Consequently, apart from the components illustrated in FIGS. 3 and 4, a component that is evidently a component of the image forming apparatus 20 may be included.

1.2.3 Terminal

FIG. 6 is a diagram illustrating an example of a functional configuration of the terminal 30.

A controller 300 is a functioning part for controlling the terminal 30 as a whole. The controller 300 reads and executes various programs stored in a storage 310 so as to realize various functions and is constituted of a CPU and the like, for instance.

The storage 310 is the functioning part, in which various programs required for actions of the terminal 30 and various kinds of data are stored. The storage 310 includes a recording device capable of temporary storage such as a DRAM, and a non-transitory recording device such as a SSD constituted of a semiconductor memory and a HDD constituted of a magnetic disk.

The storage 310 stores an operation order table 312 for storing the operation order, authentication information 314, and a setting application 316.

The operation order table 312 stores the order of operations for setting received through a communications section 350 or the order of operations selected by the user, for instance. If the same contents are stored in the operation order table 212 and the operation order table 312, the image forming apparatus 20 including the operation order table 212 and the terminal including the operation order table 312 may be assumed as devices associated with each other.

The authentication information 314 contains information used by the authentication unit 302 during the authentication. If the authentication unit 302 performs authentication using a PIN code, the authentication information 314 contains the PIN code. The authentication information 314 is capable of containing information received from the server 10 and information input by the user.

The setting application 316 is an application that is started when the terminal 30 is registered as an operation device for the image forming apparatus 20. The setting application 316 may be stored in the storage 310 in advance or downloaded from outside through the communications section 350 and installed.

The display 320 is a functioning part for displaying images and characters. The display 320 is constituted of an LCD, an organic EL panel or the like. The display 320 may be a single display device or include an additional display device externally connected.

The operation section 330 accepts the input of an operation from the user. The operation section 330 is constituted of hardware keys or software keys, for instance.

The communications section 350 is a functioning part for the connection with a network. The communications section 350 is constituted of an interface connectable to a wired LAN, a wireless LAN or a LTE network, for instance. Connection of the communications section 350 to such a network allows connection to another device or an external network.

The communications section 350 may have a plurality of functions. For instance, the communications section 350 may include a communications section for the connection to a network such as a LAN and a communications section for communicating with a terminal. In addition, the communications section 350 may include a communications section employing short-range radio communication such as NFC and Bluetooth (registered trademark).

1.3 Processing Flow

Figure 7:
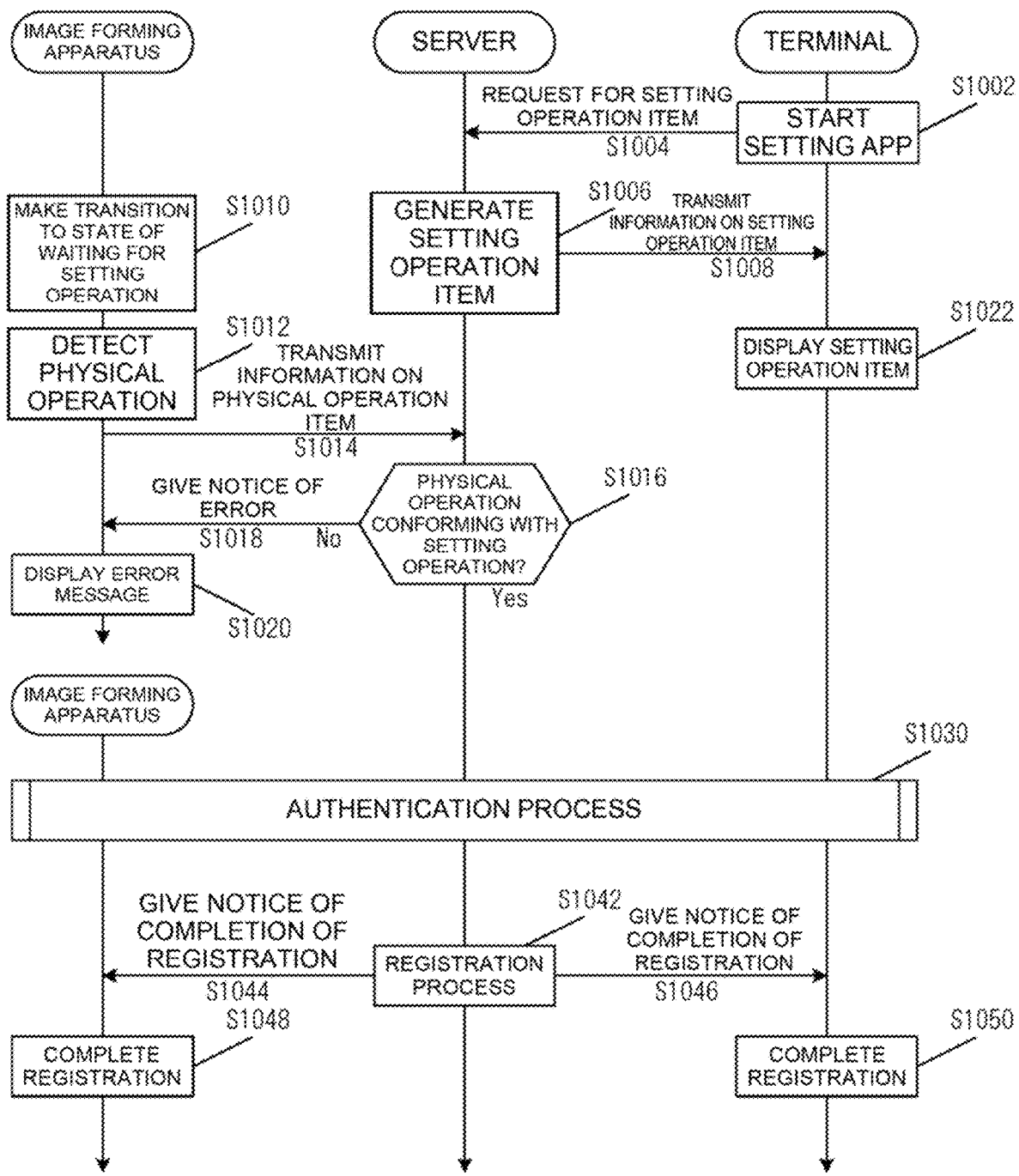
FIG. 7 is a diagram for explaining a processing flow in the first embodiment.

FIG. 7 is a diagram for explaining a processing flow of the system 1 as a whole. The system 1 of the first embodiment is the embodiment, in which the image forming apparatus 20, the server 10, and the terminal 30 cooperate with one another.

Initially, the controller 300 of the terminal 30 starts the setting application 316 (step S1002). The setting application 316 started by the controller 300 may be downloaded from outside or stored in advance by the terminal 30.

Next, the controller 300 makes a request to the server 10 for an item used for a setting operation (setting operation item) (step S1004). If receiving the request for the setting operation item, the server 10 (the controller 100) generates the setting operation item (step S1006).

The request transmitted in step S1004 may include information on the image forming apparatus 20. In addition, the request may include information on the terminal 30 as a transmitter.

The controller 100 extracts items of operations possible on the image forming apparatus 20, which items are included in the operation item list 112, for instance. Then, the controller 100 combines the operation items, which are extracted and used for the setting operation, and outputs the operation items as setting operation items.

The setting operation items may randomly be generated by the controller 100 of the server 10. The number of setting operation items to be generated may be specified in advance or specified by the user or specified at random.

After selecting the items used for the setting operation and generating the setting operation items, the controller 100 transmits information containing the setting operation items to the terminal 30 (step S1008). The terminal 30 displays the setting operation items based on the received information on the setting operation items (step S1022). In other words, the terminal 30 temporarily or non-temporarily stores the information containing the setting operation items. As a result, the terminal 30 is associated with the image forming apparatus 20. The capability to display the setting operation items is enough for the terminal 30.

The user causes the image forming apparatus 20 to make the transition to a state of waiting for a setting operation (step S1010). The state of waiting for a setting operation refers to a state of accepting a physical operation and the order of the physical operation from the user. In other words, if the user inputs an operation to register the terminal 30 for remote operation through an operation menu of the image forming apparatus 20, the image forming apparatus 20 makes the transition to a mode (state) of being subjected to the detection of a physical operation.

The image forming apparatus 20 may be caused to make the transition to the state of waiting for a setting operation by an operation performed by the user or a signal received from the server 10. The image forming apparatus 20 may be caused to make the transition to the state of waiting for a setting operation by a signal received from the terminal 30.

The image forming apparatus 20 detects a physical operation performed by the user (step S1012). The image forming apparatus 20 then transmits information on an item of the performed physical operation to the server 10 (step S1014). The information on the item of the performed physical operation may contain the item of the performed physical operation or the order of performance of the performed physical operation. The controller 200 may transmit the information on the item of the performed physical operation to the server 10 each time when a physical operation is detected. The controller 200 may collectively transmit information on items of performed physical operations to the server 10 when a terminating operation is performed, when a specified time has elapsed or when a specified number of operations have been detected.

The controller 100 may associate the image forming apparatus 20 and the terminal 30 with each other. For instance, the information on the transmitter (information on the terminal 30) included in the request transmitted in step S1004 and information on the transmitter (information on the image forming apparatus 20) contained in the information transmitted in step S1014 may be associated with each other. Thus, the image forming apparatus 20, on which a physical operation is performed, and the terminal 30, which displays the setting operation items, are associated with each other.

The controller 100 of the server 10 determines whether the setting operation generated in step S1006 and the physical operation received from the image forming apparatus 20 conform with each other (step S1016). That the setting operation and the physical operation conform with each other refers to that the two operations conform with each other in item and order. It may be set enough by an administrator that the operations conform with each other in item.

The controller 100 determines that an operation of registration is properly performed if the setting operation and the physical operation conform with each other, that is to say, conform with each other in contents of item and order (Yes in step S1016).

On the other hand, the controller 100 determines that the operation of registration has not properly been performed if the physical operation and the setting operation do not conform with each other (No in step S1016), and transmits an error notice to the image forming apparatus 20 (step S1018).

If receiving the error notice, the controller 200 of the image forming apparatus 20 displays an error message and terminates the processing (step S1020). The server 10 may additionally transmit the error notice to the terminal 30. In that case, the processing may be terminated also in the terminal 30.

The image forming apparatus 20 (the controller 200), which has received the error notice, may not only display the error message but perform again a process for accepting a physical operation. In that case, the controller 200 may repeat the processing from step S1012.

Subsequently, the system 1 may perform the authentication process (step S1030). Authentication may be assumed to have been achieved by the physical operation as above. In that case, the authentication process in step S1030 does not need to be performed.

If the authentication process has not been performed or the authentication process has been performed so as to properly achieve authentication, the server 10 performs a registration process (step S1042). In other words, the registration unit 104 registers the terminal 30 as an operation device for the image forming apparatus 20.

After completing the registration, the controller 100 transmits a notice of completion of registration to the image forming apparatus 20 (step S1044). As a result, the image forming apparatus 20 registers the terminal 30 as an operation device, thereby completing the registration (step S1048). In other words, the terminal 30, which is associated with the image forming apparatus 20, is appropriately registered as an operation device.

The controller 100 also transmits the notice of completion of registration to the terminal 30 (step S1046). As a result, the terminal 30 registers itself as an operation device for the image forming apparatus 20, thereby completing the registration (step S1050). The terminal 30 thus becomes able to transmit and receive an operation signal to and from the image forming apparatus 20.

1.4 Exemplary Action

Figure 8:
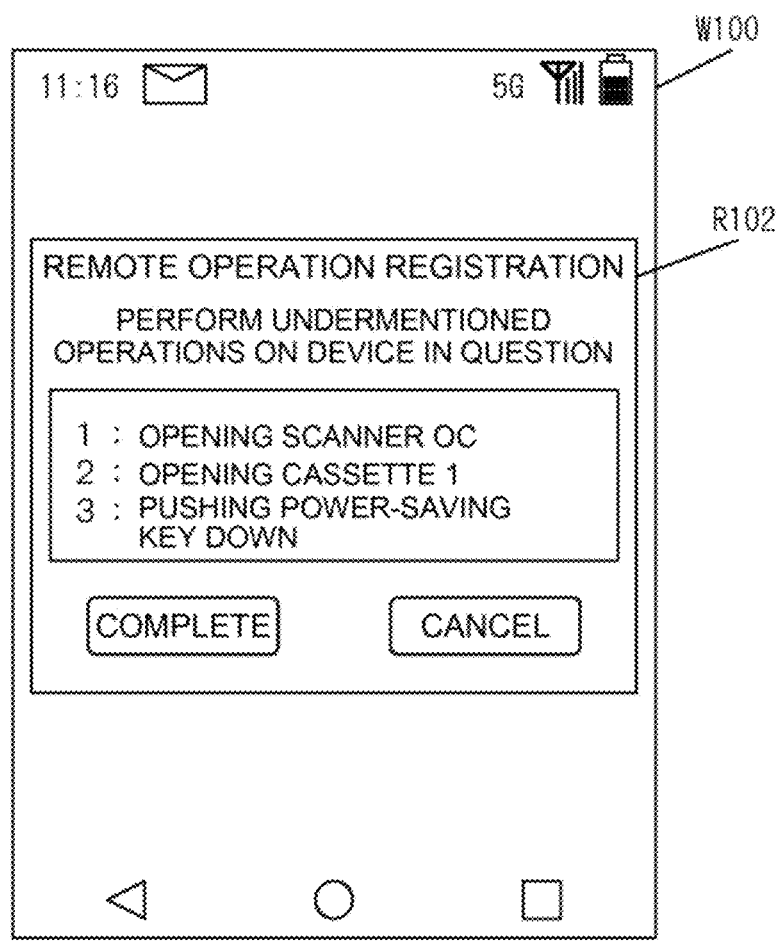
FIG. 8 is a diagram for explaining an exemplary action (exemplary screen) in the first embodiment.

Exemplary actions in the present embodiment are described with reference to FIGS. 8 and 9. FIG. 8 illustrates an example of a display screen W100, on which the setting operation items are displayed by the terminal 30 in step S1022. The operation items are listed in a region R102 of the display screen W100.

For instance, "opening scanner original cover (OC)", "opening cassette 1", and "pushing power saving key down" are displayed in the region R102 as physical operations. The user, who views the display screen W100 as such, understands that the three physical operations need to be performed.

Figure 9:
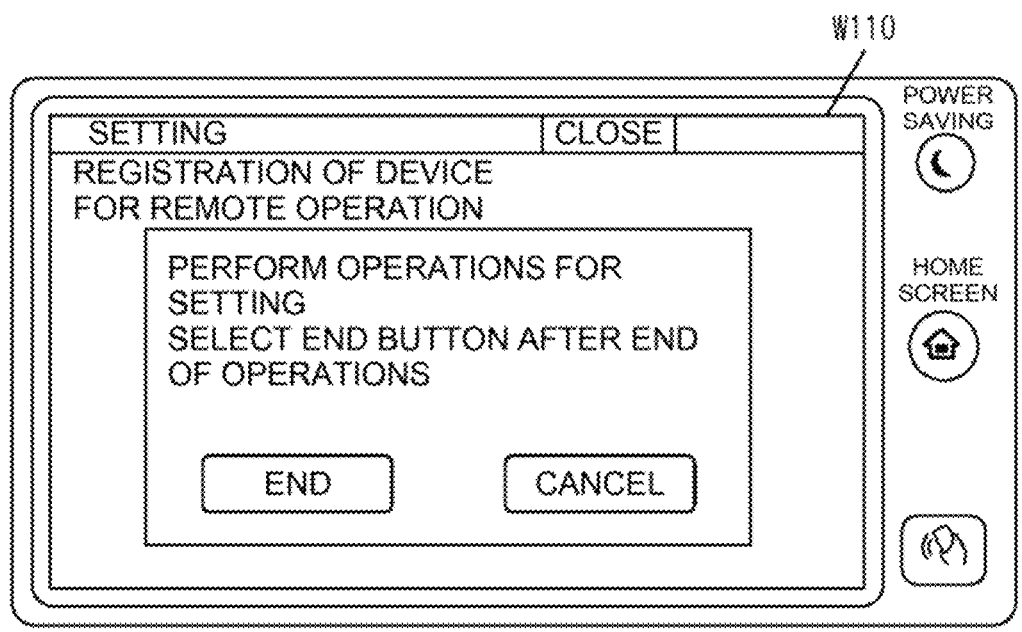
FIG. 9 is a diagram for explaining an exemplary action (exemplary screen) in the first embodiment.

FIG. 9 illustrates an example of a display screen W110 displayed when the image forming apparatus 20 has made the transition to the state of waiting for a setting operation. The display screen W110 is displayed if the detection of a physical operation is performed for the setting operation.

In FIG. 9, an "end" button is selected after all the physical operations have ended, and the controller 200 stores items of physical operations detected before the "end" button is selected and the order of performance of such physical operations.

In the state of waiting for a setting operation (state where the display screen W110 in FIG. 9 is displayed), a process other than a normal detection operation may be performed. For instance, an error message is displayed on the display 220 if the front cover is opened by the user. In the state of waiting for a setting operation, the error message may not be displayed. If selection of a power-saving key is performed by the user as a physical operation, the transition to a power-saving state is not made and such selection is stored as one of the physical operations performed in order.

Thus, according to the present embodiment, a physical operation on the image forming apparatus 20 is required when the terminal 30 is registered as an operation device for the image forming apparatus 20. Consequently, it is necessary to actually perform an operation in front of the image forming apparatus 20, which makes it possible to prevent a disguise of a third party.

1.5 Authentication Process

Figure 10:
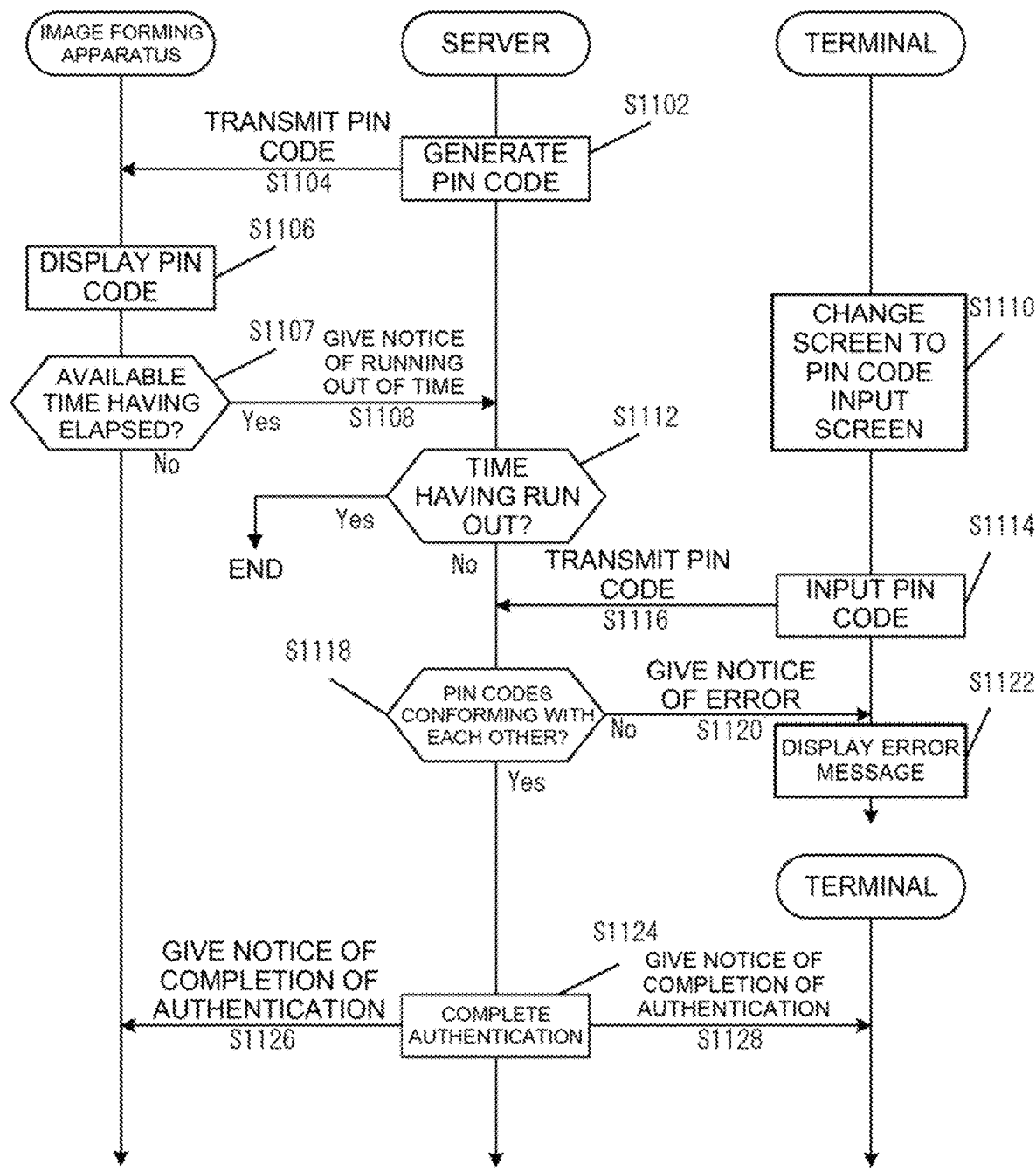
FIG. 10 is a diagram for explaining a processing flow in the first embodiment.

In the embodiment as above, the authentication process may be performed in step S1030. FIG. 10 illustrates an example of the authentication process using a PIN code that is a kind of identification information.

The server 10 (the authentication unit 102) generates a PIN code (step S1102). The authentication unit 102 generates the PIN code by a one-time password method, for instance.

The authentication unit 102 transmits the PIN code to the image forming apparatus 20 (step S1104). The controller 200 (the authentication unit 204) of the image forming apparatus 20 displays the received PIN code on the display 220 (step S1106).

The user inputs the PIN code, which is displayed on the image forming apparatus 20, with the terminal 30. Specifically, on the terminal 30, a screen is changed to a PIN code input screen (step S1110). A screen allowing the PIN code to be input by the user or a screen allowing the PIN code to be input based on a signal from the server 10 or the image forming apparatus 20 may be displayed as the PIN code input screen (step S1110).

The user inputs the PIN code through the terminal 30, and the authentication unit 302 transmits the PIN code to the authentication unit 102 of the server 10. If the server 10 does not receive the PIN code from the terminal 30 within a specified time, it is determined that the time has run out, and the processing is terminated. In other words, if determining that an available time has run out (Yes in step S1107), the image forming apparatus 20 notifies the server 10 that the time has run out (step S1108).

Then, the authentication unit 102 of the server 10 terminates the present procedure based on the notice of running out of time (Yes in step S1112).

If the PIN code is transmitted from the terminal 30 within the available time (step S1116 following step S1114) and the PIN code generated in step S1102 and the PIN code input with the terminal 30 do not conform with each other (No in step S1118), the authentication unit 102 transmits an error notice (step S1120). If receiving the error notice (step S1120), the terminal 30 displays an error message that the terminal 30 failed to be registered with the image forming apparatus 20 as an operation device (step S1122), and terminates the processing.

If the PIN codes conform with each other (Yes in step S1118), the authentication unit 102 determines that authentication has properly been carried out (step S1124), and transmits a notice of completion of authentication to the image forming apparatus 20 and the terminal 30.

Figure 11:
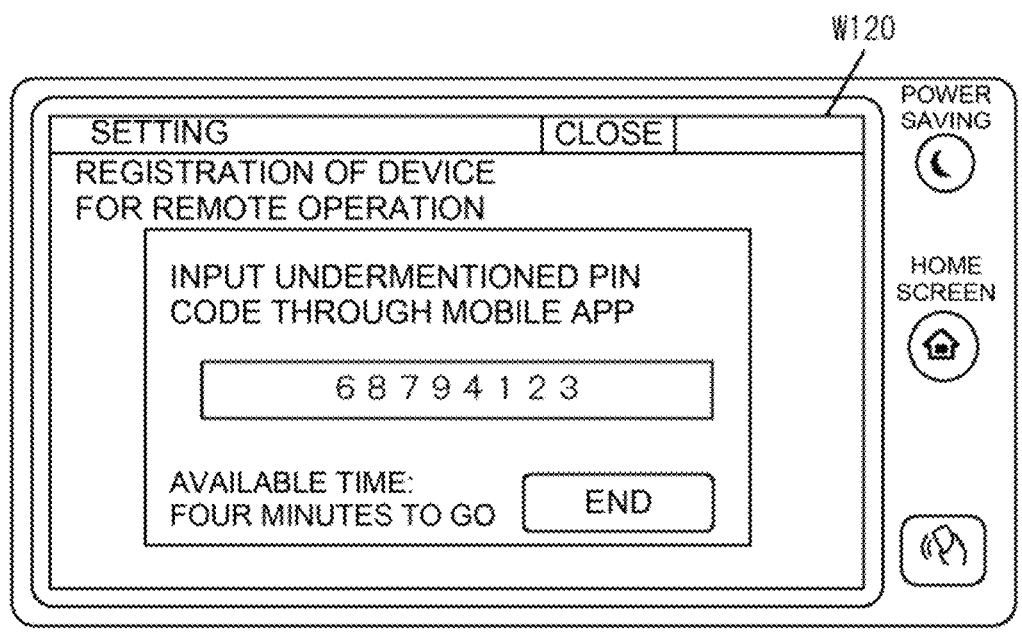
FIG. 11 is a diagram for explaining an exemplary action (exemplary screen) in the first embodiment.

FIG. 11 illustrates an example of a display screen W120 of the image forming apparatus 20, on which the PIN code is displayed. The user is able to confirm the PIN code to be input with the terminal 30 by checking the display screen W120.

Figure 12:
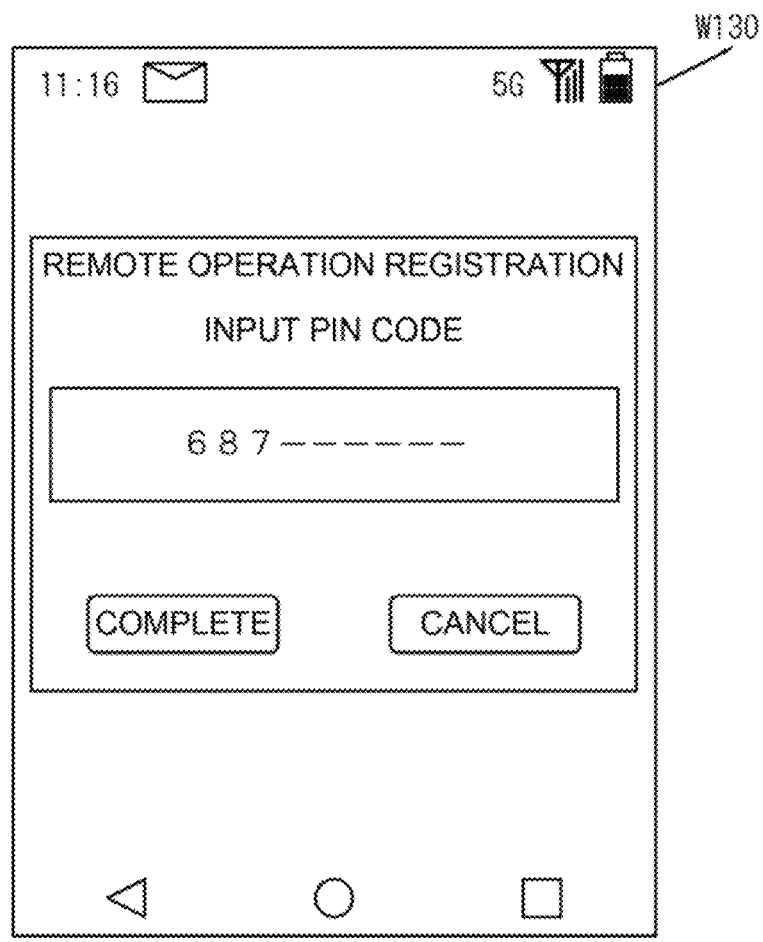
FIG. 12 is a diagram for explaining an exemplary action (exemplary screen) in the first embodiment.

FIG. 12 illustrates an example of a display screen W130 of the terminal 30, on which the PIN code is being input. The user inputs, on the terminal 30, the PIN code displayed on the image forming apparatus 20.

Figure 13:
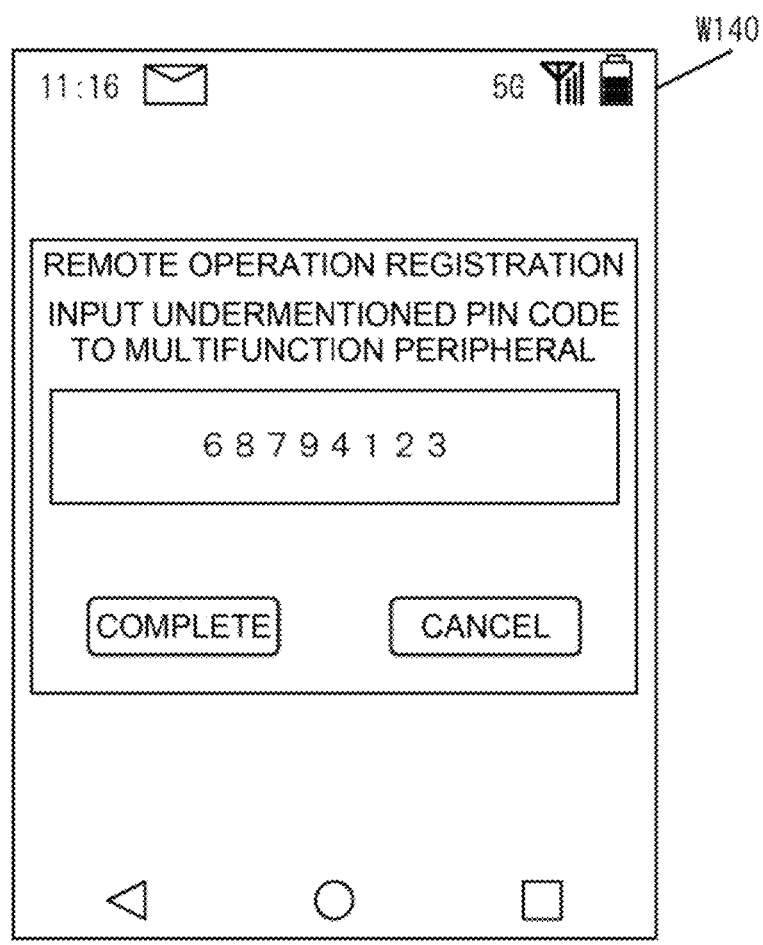
FIG. 13 is a diagram for explaining an exemplary action (exemplary screen) in the first embodiment.

In the example illustrated in FIG. 10, the PIN code displayed on the image forming apparatus 20 is input with the terminal 30, while the reverse is also possible. In other words, the server 10 transmits the PIN code to the terminal 30 and the terminal 30 displays the received PIN code. The terminal 30 displays the PIN code in such an exemplary manner as illustrated in a display screen W140 in FIG. 13. The user is able to know the PIN code by viewing the terminal 30.

Figure 14:
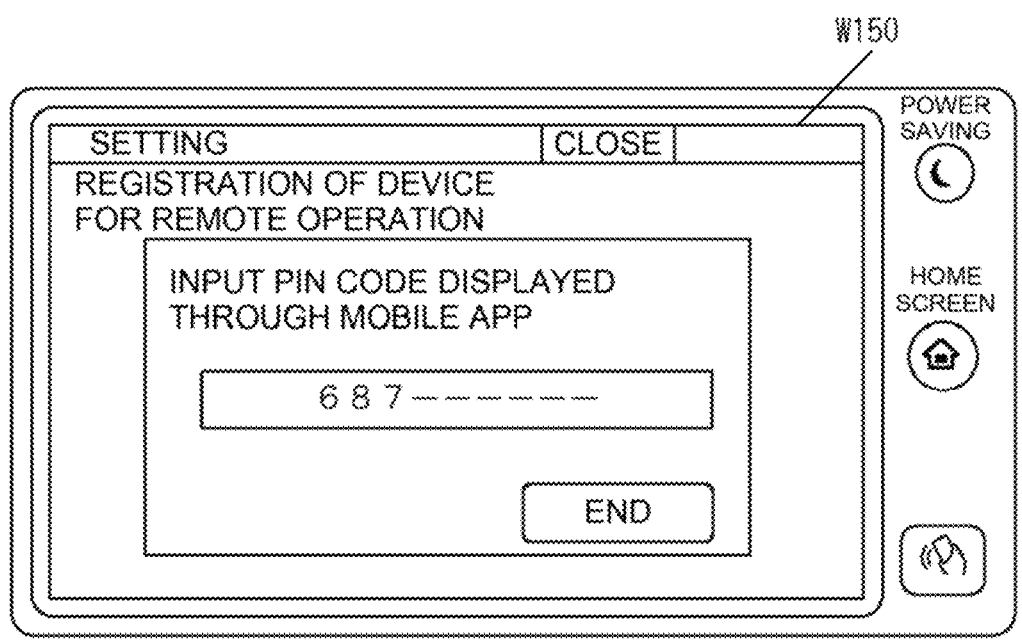
FIG. 14 is a diagram for explaining an exemplary action (exemplary screen) in the first embodiment.

The image forming apparatus 20 accepts the input of the PIN code. The user inputs the PIN code through the image forming apparatus 20 in such an exemplary manner as illustrated in a display screen W150 in FIG. 14. If the PIN code displayed on the terminal 30 and the PIN code input through the image forming apparatus 20 conform with each other, the server 10 determines that authentication has properly been carried out.

The authentication process may be performed before the physical operation. In FIG. 7, for instance, the authentication process may initially be performed after the setting application 316 is run in the terminal 30. The determination of registration based on a physical operation may be performed if authentication has properly been carried out by the authentication process.

The image forming apparatus 20 and the terminal 30, for which the authentication process has appropriately been performed, may be treated as devices associated with each other.

Thus, according to the present embodiment, it is possible to register the terminal 30 as a device capable of operating the image forming apparatus 20. In other words, the terminal 30 is registered as a device capable of operating the image forming apparatus 20 if the order of operations physically detected on the image forming apparatus 20 and the order of operations stored in the terminal 30 conform with each other.

The terminal 30, which is capable of operating the image forming apparatus 20, may be associated with the image forming apparatus 20 based on the information on the terminal 30, which information is included in the request for the setting operation item.

While the identification information has been described using the PIN code as an example, the identification information may be a one-time password including alphanumeric characters or a unique code recognizable by a two-dimensional code.

2. Second Embodiment

A second embodiment described below is the embodiment, in which it is determined by the image forming apparatus 20 whether a physical operation and a setting operation conform with each other. The description on the second embodiment is made centering at the changes in the configuration of the system 1, in the functional configurations of the devices, and in the flows of processing as compared with the first embodiment. To parts not described below, the first embodiment is applicable.

Figure 15:
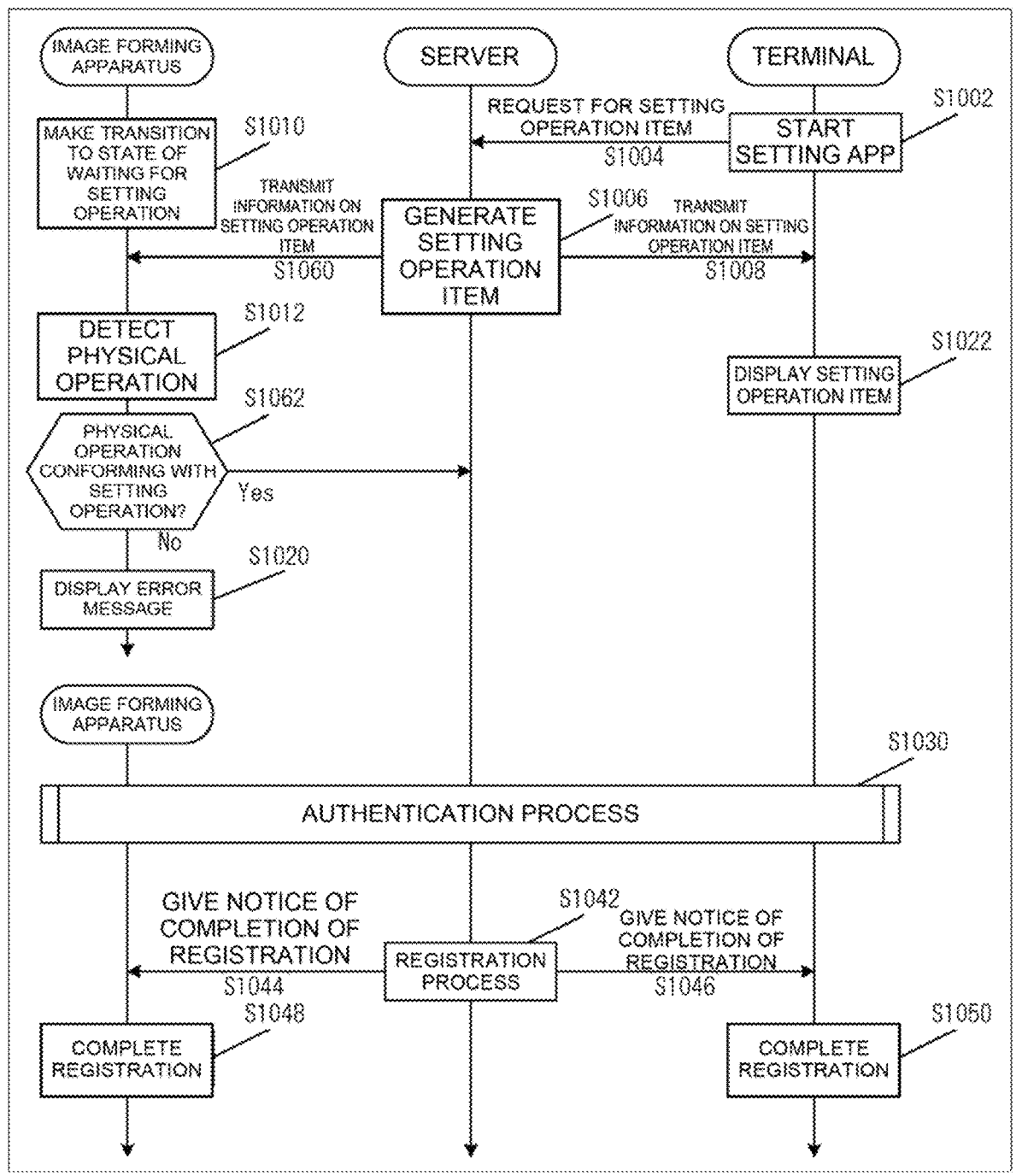
FIG. 15 is a diagram for explaining a processing flow in a second embodiment.

FIG. 15 is a sequence diagram replacing a sequence diagram of FIG. 7 illustrating the processing in the first embodiment. The same step numbers are imparted to the same processes.

In FIG. 15, the server 10 generates the setting operation item (step S1006) and transmits the setting operation item to the terminal 30 (step S1008). At the same time, the server 10 transmits the setting operation item to the image forming apparatus 20 (step S1060). The image forming apparatus 20, which is a destination of transmission, may be the image forming apparatus 20 as selected with the setting application 316. Information on the image forming apparatus 20 as selected with the setting application 316 may be included in the request for the setting operation item (step S1004). The image forming apparatus 20, which is the destination of transmission, may be specified or predetermined in the server 10.

The image forming apparatus 20, to which information on the setting operation item has been transmitted, and the terminal 30 are made associated with each other.

If detecting a physical operation (step S1012), the image forming apparatus 20 determines whether the physical operation and the setting operation conform with each other (step S1062). The image forming apparatus 20 determines that a registration process has appropriately been performed if the setting operation and the physical operation conform with each other (Yes in step S1062).

Thus, according to the present embodiment, it is possible to determine whether the physical operation and the setting operation conform with each other on the image forming apparatus 20. As a result, the server 10 and the image forming apparatus 20 can communicate with each other more simply.

In FIG. 15, the setting operation item is generated in step S1006, while the setting operation item may be generated with the setting application 316 in the terminal 30. In that case, the terminal 30 may additionally transmit the setting operation item in step S1004. In addition, the terminal 30 may directly transmit the setting operation item to the image forming apparatus 20.

3. Third Embodiment

A third embodiment is the embodiment, in which the image forming apparatus 20 has functions of the server 10. The description on the third embodiment is made centering at the changes in the configuration of the system 1, in the functional configurations of the devices, and in the flows of processing as compared with the first embodiment. To parts not described below, the first embodiment is applicable.

The image forming apparatus 20 in the present embodiment has functions of the server 10. For instance, the controller 200 of the image forming apparatus 20 is capable of realizing the function of the registration unit 104 illustrated in FIG. 2. The storage 210 of the image forming apparatus 20 appropriately stores the information stored in the storage 110 in FIG. 2.

Figure 16:
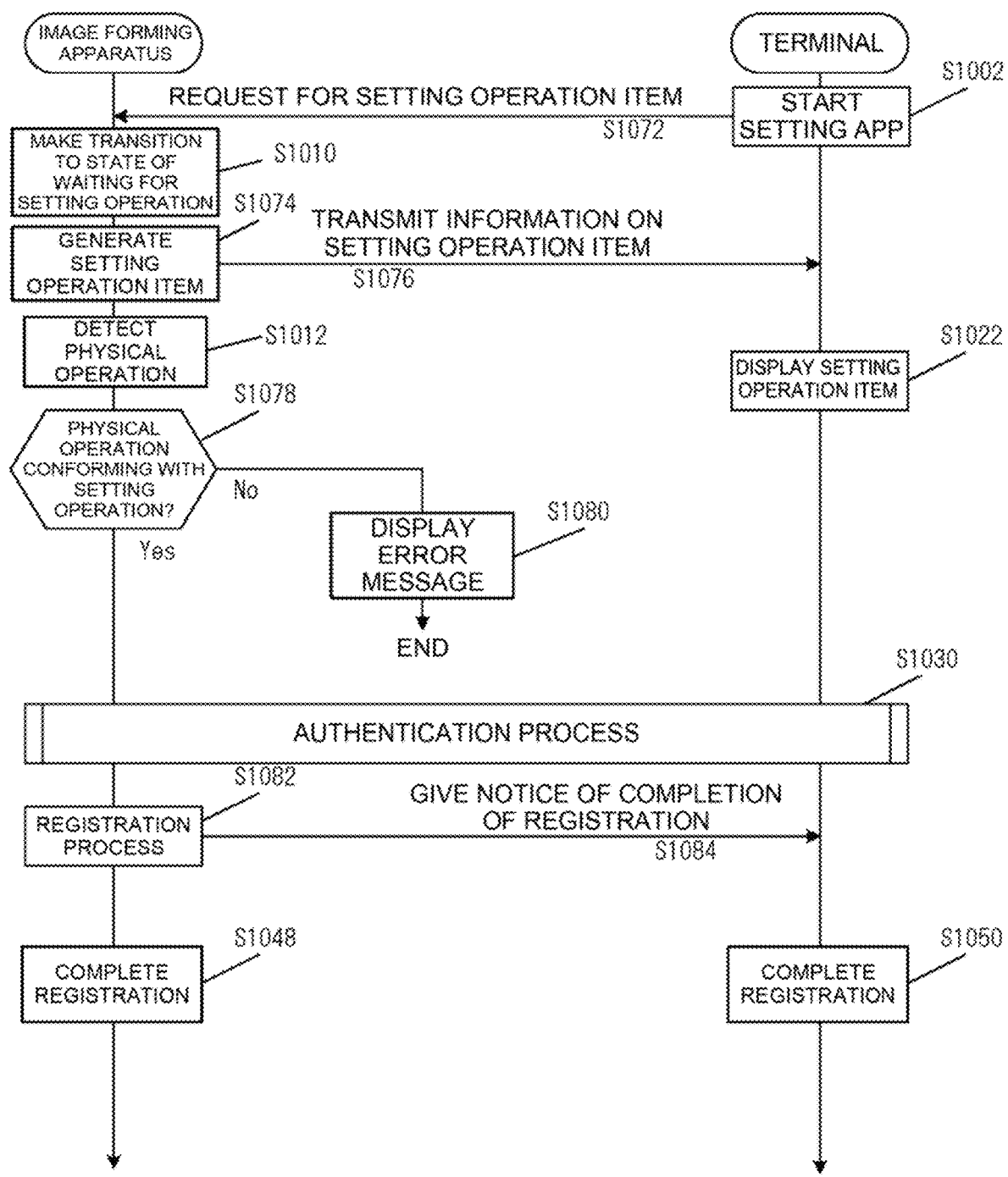
FIG. 16 is a diagram for explaining a processing flow in a third embodiment.

FIG. 16 is a sequence diagram replacing the sequence diagram of FIG. 7 illustrating the processing in the first embodiment. The same step numbers are imparted to the same processes.

The terminal 30, which has started the setting application 316 (step S1002), requests for a setting operation item (step S1072). The terminal 30 transmits a request for the setting operation item to the image forming apparatus 20 as a destination of transmission, which is selected with the setting application 316. The image forming apparatus 20 as a destination of transmission may be the image forming apparatus 20, which is located in the vicinity of the terminal 30, or may be selected from among image forming apparatuses 20 connected in a network. The terminal 30 may specify the image forming apparatus 20 as a destination of transmission based on a specified operation performed through the image forming apparatus 20.

The request for the setting operation item may not be transmitted from the terminal 30 to the image forming apparatus 20 but the user may make the respective devices function.

The respective devices may be made to function by bringing the terminal 30 closer to the image forming apparatus 20 (making a touch in an NFC region, for instance).

Based on any of such methods, the image forming apparatus 20 and the terminal 30 are made associated with each other.

The image forming apparatus 20 generates the setting operation item (step S1074) and transmits information on the setting operation item to the terminal 30 (step S1076). In other words, in the present embodiment, it is preferable that the terminal 30 and the image forming apparatus 20 are connected to each other by some communications means.

The information on the setting operation item may be displayed on the display 220 of the image forming apparatus 20 with a two-dimensional bar code or the like and read by the terminal 30 so as to acquire the setting operation item.

The terminal 30 displays the setting operation item on the display 320. The image forming apparatus 20 detects a physical operation (step S1012), and determines that a registration process has appropriately been performed if the physical operation and the setting operation conform with each other (Yes in step S1078).

If the registration process has appropriately been performed (step S1082), the image forming apparatus 20 transmits a notice of completion of registration to the terminal 30 (step S1084).

In the present embodiment, the setting operation item is generated on the image forming apparatus 20 while the terminal 30 is checkable to the user. Consequently, it is possible to appropriately perform the registration process even though the setting operation item is generated by the image forming apparatus 20.

In the present embodiment, the authentication process may previously be performed in order to establish a communications path between the terminal 30 and the image forming apparatus 20.

4. Fourth Embodiment

A fourth embodiment is the embodiment, in which no setting operations are generated and a physical operation performed on the image forming apparatus 20 is input with the terminal 30.

The description on the fourth embodiment is made centering at the changes in the configuration of the system 1, in the functional configurations of the devices, and in the flows of processing as compared with the first embodiment. To parts not described below, the first embodiment is applicable.

Figure 17:
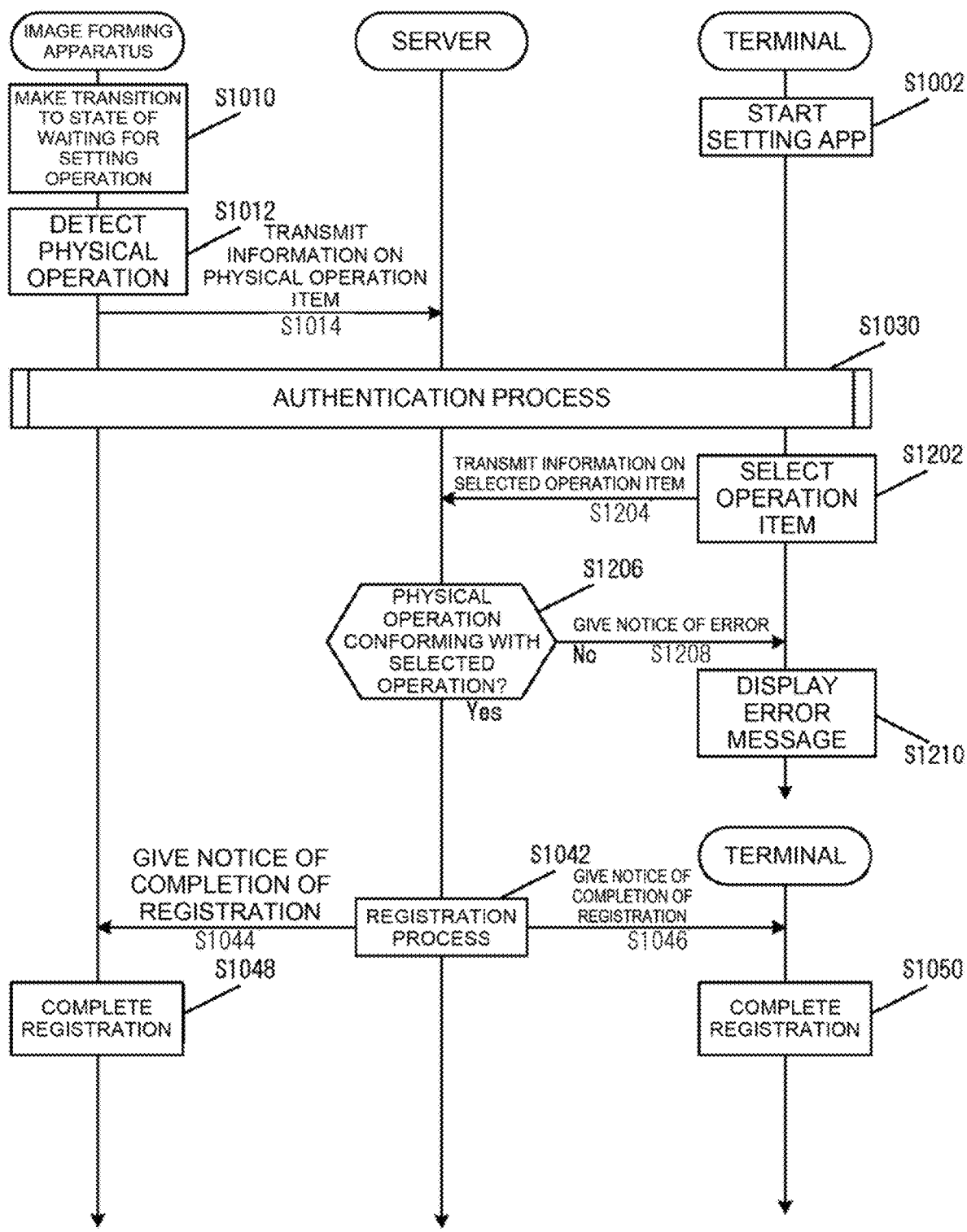
FIG. 17 is a diagram for explaining a processing flow in a fourth embodiment.

FIG. 17 is a sequence diagram replacing the sequence diagram of FIG. 7 illustrating the processing in the first embodiment. The same step numbers are imparted to the same processes.

Initially, the image forming apparatus 20 makes the transition to the state of waiting for a setting operation (step S1010) and detects a physical operation (step S1012). Then, information on an item of the physical operation detected by the image forming apparatus 20 (the item and the order of the physical operation as performed, for instance) is transmitted to the server 10 (step S1014).

The terminal 30 selects an item of an operation physically performed on the image forming apparatus 20 along with the order (step S1202). The terminal 30 then transmits information on the selected item of the operation (selected operation) to the server 10 (step S1204).

The information on the item of the selected operation contains the item and the order of the selected operation. The image forming apparatus 20 as a transmitter, which is specified based on the information in step S1014, and the terminal 30 as a transmitter, which is specified based on the information in step S1204, are made associated with each other.

Next, the server 10 determines whether the physical operation and the selected operation conform with each other (step S1206). In other words, the server 10 (the controller 100) determines whether the item and order of the physical operation detected in step S1012 and the item and order of the selected operation selected in step S1202 conform with each other.

If the two operations do not conform with each other, the server 10 transmits an error notice (step S1208) and an error message that the registration failed is displayed on the display 320 of the terminal 30 (step S1210). The error notice may be transmitted to the image forming apparatus 20. The error message that the registration failed may be also displayed on the display 220 of the image forming apparatus 20.

If the operations do not conform with each other in step S1206, an operation item may be selected anew. For instance, the terminal 30 may repeat the processing from step S1202.

Figure 18A:
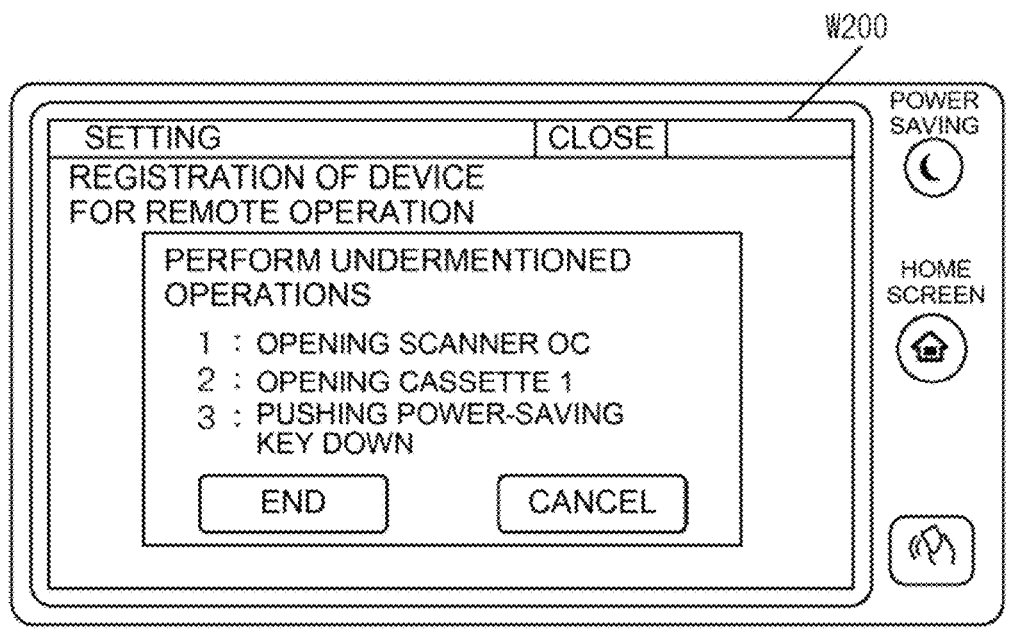
FIGS. 18A and 18B are diagrams for explaining exemplary actions (exemplary screens) in the fourth embodiment.

FIG. 18A illustrates a display screen W200 of the image forming apparatus 20, on which items of physical operations to be performed are displayed. The user may perform the physical operations displayed on the display screen W200 in accordance with a guidance about the physical operations.

Figure 18B:
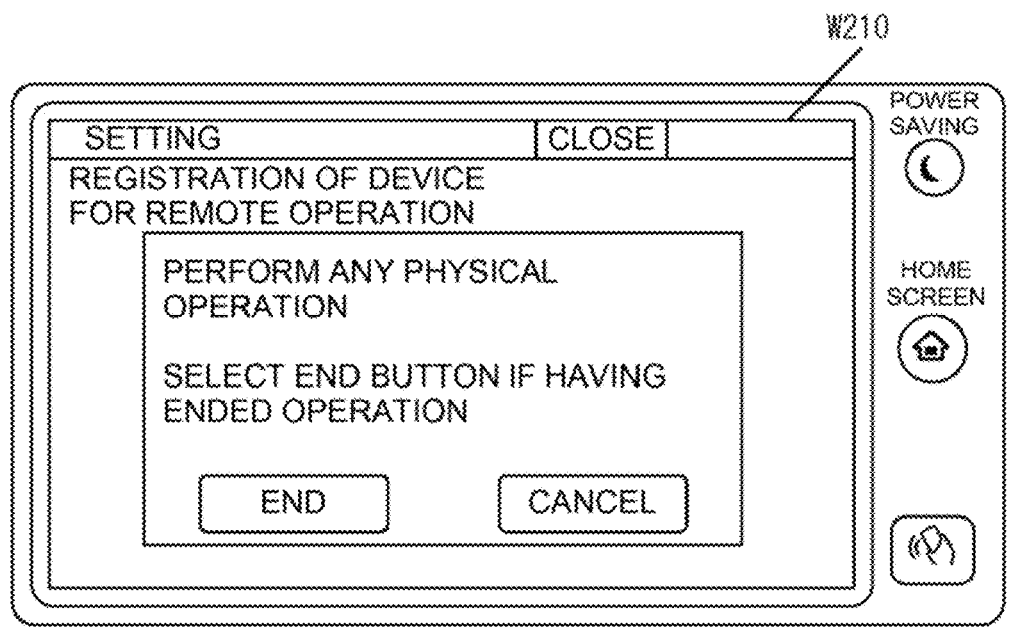

As seen from FIG. 18B illustrating a display screen W210 of the image forming apparatus 20, the user may be allowed to perform any physical operation.

Figure 19:
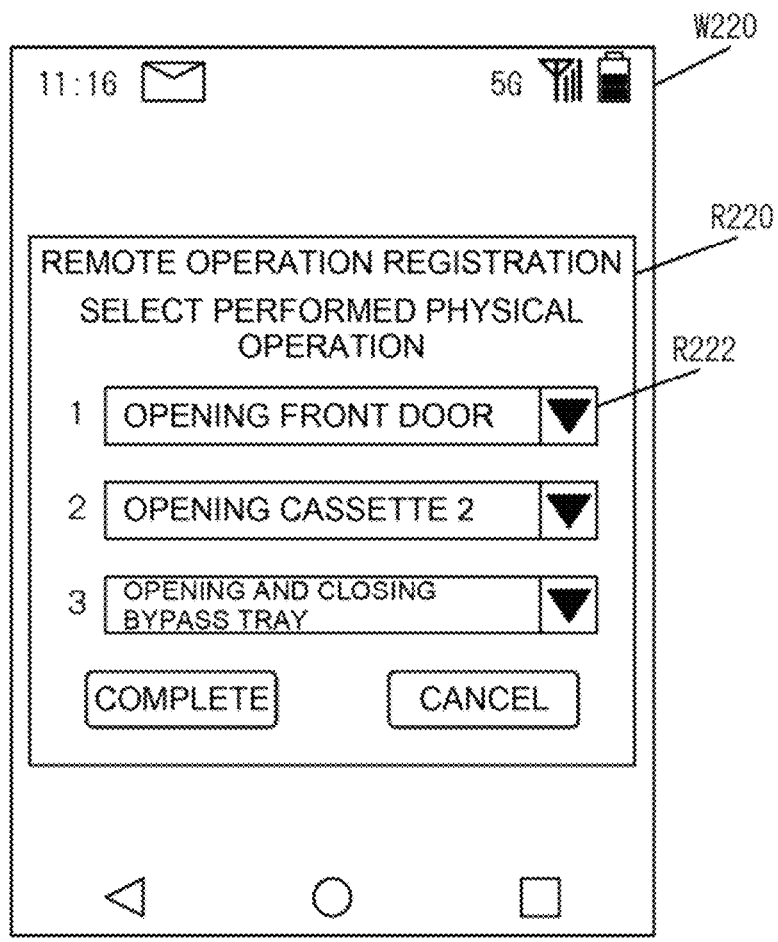
FIG. 19 is a diagram for explaining an exemplary action (exemplary screen) in the fourth embodiment.

FIG. 19 illustrates an example of a display screen W220 of the terminal 30. In a region R220 of the display screen W220 of the terminal 30, pull-down menus causing the user to select physical operations actually performed are displayed.

In a region R222, for instance, the user selects a physical operation that has been performed first. In this way, the user selects physical operations performed on the image forming apparatus 20.

5. Fifth Embodiment

A fifth embodiment is the embodiment, in which a setting operation is set on the terminal 30. In the present embodiment, a setting operation item is not generated in the server 10 but selected on the terminal 30.

The description on the fifth embodiment is made centering at the changes in the configuration of the system 1, in the functional configurations of the devices, and in the flows of processing as compared with the first and fourth embodiments. To parts not described below, the first embodiment is applicable.

In the present embodiment, unlike the fourth embodiment, an operation item selected on the terminal 30 is performed on the image forming apparatus 20 so as to perform a registration process.

Figure 20:
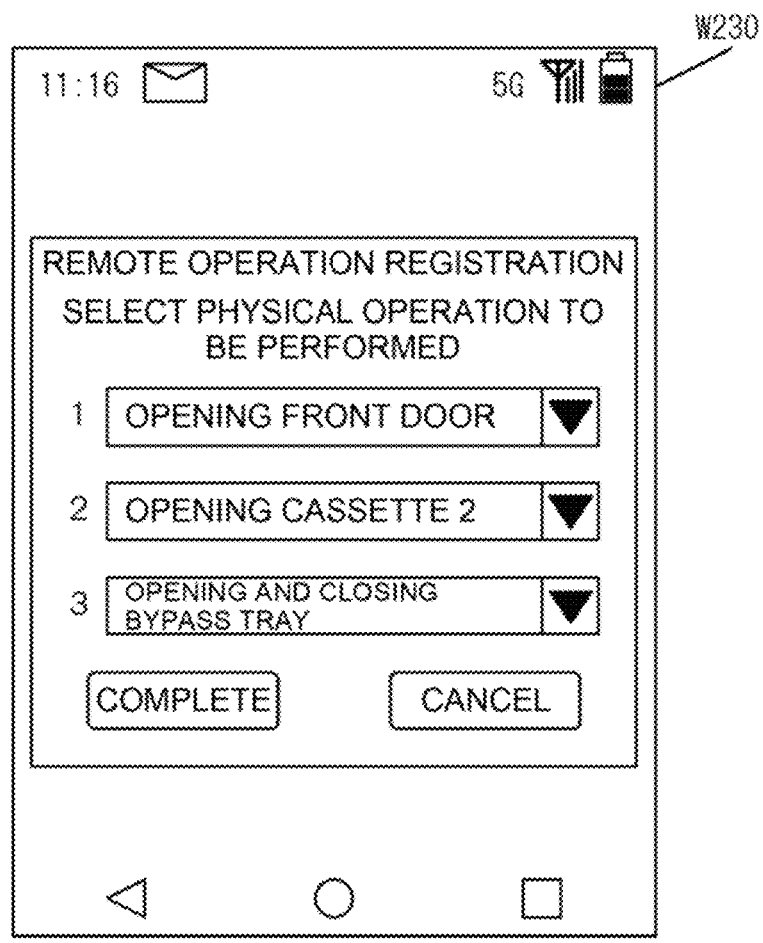
FIG. 20 is a diagram for explaining an exemplary action (exemplary screen) in a fifth embodiment.

For instance, as illustrated in FIG. 20, the user is previously caused to select, on a display screen W230 of the terminal 30, a physical operation to be performed on the image forming apparatus 20. The user performs the physical operation, which is selected on the terminal 30, on the image forming apparatus 20 so as to allow the registration process to be appropriately performed.

6. Sixth Embodiment

A sixth embodiment described below is the embodiment, in which an operation other than a physical operation is selected. In the embodiments as above, priority is put on the ease of the user's understanding, so that description is made taking a physical operation as an example. Storage, however, is also possible with respect to an operation other than a physical operation as long as the operation is detectable to the image forming apparatus 20.

For instance, items of operations of such software buttons as "a copying mode selecting button", "a copy density changing button", and "a job history calling button" may be stored in the operation item list 112. The operation item list 112 may store both of a physical operation and an operation by software or store an operation by software and a detection operation of a touch panel. Such operations may be of a single kind or may be stored in combination.

In other words, an operation in the present embodiment is preferably an operation to change an action mode, an operation to effect a copying action or an operation to replenish sheets of paper as an operation other than a mere input operation that is performed with a keyboard or for numerical input.

7. Modification

The embodiments of the present invention have been detailed above with reference to the drawings, while a specific configuration is not limited to the embodiments and a design and the like not departing from the gist of the present invention are included in the claims.

It is intended that the technologies disclosed in the embodiments, exemplary applications, exemplary actions, and the modification as above are used not only alone but in combination as far as possible.

The embodiments as above can be applied in combination. For instance, the fourth embodiment can be realized only with the image forming apparatus 20 and the terminal 30 by causing the image forming apparatus 20 to have functions of the server 10.

In the embodiments as above, the image forming apparatus 20 is assumed as the first device and the terminal 30 is assumed as the second device, while a combination of other devices is also usable. Any device that is remotely operable, such as a television set, an audio, an air conditioner, and an air cleaner, is usable as the first device.

As the second device, any device that can be used as an operation device, such as a smartphone, a tablet, a computer, and a wearable device, will do.

Programs that run in the respective devices in the embodiments are each a program for controlling a CPU and the like (program for causing a computer to function) so that the functions as above of the embodiments may be realized. Information dealt with in the devices is temporarily stored in a temporary storage (random access memory (RAM), for instance) during the processing of the information, then stored in various storages, such as a read-only memory (ROM) and a HDD, and read by a CPU as required so as to perform correction or writing on the information.

If the programs are to be circulated on the market, the programs can be stored in a portable recording medium and as such circulated, or transferred to a server computer connected over a network such as the Internet. In the latter case, a storage in the server computer is naturally included in the present invention.

What is claimed is:

1. A method for registration in an image forming apparatus operable by an operation device, the method comprising:
   detecting an operation of the image forming apparatus;
   displaying items of a plurality of operations on a display of a terminal connectable to the image forming apparatus; and
   registering the terminal as the operation device if an item of an operation detected by the detecting conforms with an item of an operation displayed on the display of the terminal,
   wherein the detecting includes detecting, as an operation, that a mechanism has been opened and closed by a physical operation.

2. The method for registration according to claim 1,
   wherein the displaying includes displaying the items of the plurality of operations on the display in order, and
   wherein the registering includes registering the terminal as the operation device if an order of items of operations detected by the detecting conforms with the order of items of operations displayed on the display.

3. The method for registration according to claim 1, further comprising receiving, and storing in a storage of the image forming apparatus, the items of the plurality of operations,
   wherein the registering includes registering the terminal as the operation device if the item of the operation detected by the detecting conforms with an item of an operation stored in the storage.

4. The method for registration according to claim 1, wherein the item of the operation displayed on the display of the terminal is generated by the image forming apparatus and then received and displayed on the display by the terminal.

5. The method for registration according to claim 1,
   wherein the terminal allows input of items of operations, and
   wherein the displaying includes displaying a plurality of operations on the display based on a plurality of items input.

6. The method for registration according to claim 1, further comprising:
   using a server connectable to the terminal and the image forming apparatus;
   transmitting items of a plurality of operations from the server to the terminal; and
   receiving items of a plurality of operations from the image forming apparatus by the server,
   wherein the registering includes notifying the image forming apparatus that the terminal is registered as the operation device, if the items of the plurality of operations transmitted by the server to the terminal conform with the items of the plurality of operations received from the image forming apparatus.

7. The method for registration according to claim 1, wherein the operation includes at least one among opening and closing of a door of the image forming apparatus, opening and closing of a scanner cover, as well as opening and closing of a paper feed cassette.

8. The method for registration according to claim 1, wherein the operation includes operation of an operation switch.

9. The method for registration according to claim 1, further comprising generating identification information if the item of the operation detected by the detecting conforms with the item of the operation displayed on the display of the terminal,
   wherein the registering includes registering the terminal as the operation device if the identification information is input on the terminal.

10. A system comprising an image forming apparatus operable by an operation device, a terminal, and a server,
   wherein the server transmits items of a plurality of operations to the terminal if receiving a request from the terminal,
   wherein the terminal displays the items of the plurality of operations received on a display,
   wherein the image forming apparatus transmits items of a plurality of operations detected by a detector to the server,
   wherein the detecting includes detecting, as an operation, that a mechanism has been opened and closed by a physical operation, and
   wherein, if the items of the plurality of operations transmitted to the terminal conform with items of a plurality of operations received from the image forming apparatus, the server registers the terminal with the image forming apparatus as the operation device.

11. An image forming apparatus operable by an operation device, comprising:
   a storage that stores items of a plurality of operations;
   a detector that detects an operation;
   wherein the detecting includes detecting, as an operation, that a mechanism has been opened and closed by a physical operation, and
   a controller,
   wherein the controller registers a terminal associated with the image forming apparatus as the operation device if an item of an operation detected by the detector conforms with an item of an operation stored in the storage.

12. The image forming apparatus according to claim 11, further comprising a communicator,
   wherein the controller stores a plurality of operations in the storage based on items of operations received through the communicator.

13. The image forming apparatus according to claim 11, wherein the controller generates the items of the plurality of operations at random and stores the items of the plurality of operations in the storage.

* * * * *